United States Patent [19]

Kristoffersen

[11] 4,332,041
[45] Jun. 1, 1982

[54] PRESSURIZED DRAIN FOR TOILET WASTE TANK

[75] Inventor: Bjorn R. Kristoffersen, Kirkland, Wash.

[73] Assignee: The Boeing Company, Seattle, Wash.

[21] Appl. No.: 209,716

[22] Filed: Nov. 24, 1980

[51] Int. Cl.³ ............... E03D 5/016; E03D 11/00; B64D 11/02

[52] U.S. Cl. ............... 4/316; 4/321; 4/323; 4/431; 4/434; 137/205; 137/236 R; 137/236 S; 137/805

[58] Field of Search ............... 4/316, 317, 320, 321, 4/322, 323, 417, 431–434; 137/577, 205, 236 R, 236 S, 805

[56] References Cited

U.S. PATENT DOCUMENTS

| | | | |
|---|---|---|---|
| 482,439 | 9/1892 | Liernur | 4/321 X |
| 2,315,824 | 4/1943 | Sweeny | 4/77 |
| 2,749,558 | 6/1956 | Lent et al. | 4/316 |
| 3,034,131 | 5/1962 | Lent | 4/316 X |
| 3,079,612 | 3/1963 | Corliss | 4/10 |
| 3,474,467 | 10/1969 | Stinson | 4/10 |
| 3,478,690 | 11/1969 | Helke et al. | 103/93 |
| 3,510,885 | 5/1970 | Murray, Jr. | 4/77 |
| 3,536,196 | 10/1970 | Zeff et al. | 210/97 |
| 3,550,163 | 12/1970 | Jong | 4/10 |
| 3,587,116 | 6/1971 | Quase | 4/10 |
| 3,730,884 | 5/1973 | Burn et al. | 4/321 X |
| 3,922,730 | 12/1975 | Kemper | 4/316 |
| 3,963,040 | 6/1976 | Gezari | 137/344 |
| 3,995,328 | 12/1976 | Carolan | 4/316 |
| 4,063,315 | 12/1977 | Carolan et al. | 4/316 |
| 4,114,203 | 9/1978 | Carolan | 4/317 |
| 4,131,959 | 1/1979 | Albertassi et al. | 4/319 |
| 4,199,828 | 4/1980 | Heller | 4/323 X |
| 4,202,061 | 5/1980 | Water | 4/321 X |
| 4,275,470 | 6/1981 | Badger et al. | 4/316 |
| 4,297,751 | 11/1981 | Olin et al. | 4/431 |

Primary Examiner—Henry K. Artis
Attorney, Agent, or Firm—Christensen, O'Connor, Johnson & Kindness

[57] ABSTRACT

A drainage apparatus for an aircraft lavatory system includes a waste holding tank that receives waste from the individual toilet units. The waste holding tank has a pressurization port and a waste drain opening formed in an upper portion thereof. A blower is coupled to the pressurization port to force air into the tank to pressurize it, thereby forcing waste out of the tank through the waste drain opening. The waste travels through an internal waste drain conduit having a first end located at the bottom of the tank below the level of the waste and a second end coupled to the waste drain opening. Preferably, a flow control device is interposed in fluid communication between the blower and the pressurization port and is operable to direct the flow of air from the blower either into the tank for pressurization or out of the tank to create a partial vacuum within the tank to aid in vacuum flush of the toilet units. An auxiliary pressurization source is also provided in the event of blower failure. The flow control device is preferably remotely operable by ground service personnel working outside the aircraft.

9 Claims, 3 Drawing Figures

PRESSURIZED DRAIN FOR TOILET WASTE TANK

BACKGROUND OF THE INVENTION

This invention relates to aircraft toilets and, more particularly, to a pressurized drain for the waste holding tank of an aircraft toilet system.

Most airplanes presently in use have toilet systems which include an individual waste storage tank for each toilet bowl. A gravity drain is used to remove waste from the bowl and pass it to the waste storage tank. The individual waste storage tanks are then gravity-drained through openings in the skin of the aircraft during servicing of the airplane on the ground.

A more modern proposed toilet system for use in aircraft includes a vacuum flush system which drains waste material from the bowl to the remote waste storage tank by means of a partial vacuum maintained in the waste storage tank. In the majority of these systems a single waste storage tank is used to receive the waste material from several individual toilet bowls. Even though the waste is drained from the toilet bowl to the waste storage tank by vacuum pressure the servicing and emptying of the waste storage tank is still accomplished by a gravity drain through the skin of the aircraft.

The use of a gravity drain from the waste storage tank necessitates that the drainage opening in the waste storage tank be below the level of the waste therein. The location of the drain below the waste level makes the gravity drain system subject to leakage problems. For example, if the seal is deteriorated to any degree the waste material from the tank will leak around the drain seal. Leakage of the waste from the waste storage tank gravity drain is a major problem in commercial aircraft today. The leakage causes potential health hazards because of the waste material which is deposited in populous areas which otherwise would be contained within the waste storage tank. It also creates a hazard to the aircraft since in flight the liquified waste, after it leaks from the storage tank to the outer skin of the aircraft, tends to freeze into solid ice pieces which can break off and be drawn into the jet engine air intake or fall to the earth as large pieces of ice potentially causing damage to either persons or property.

It is therefore an object of the present invention to provide a drainage system for use in an aircraft toilet system which eliminates the need for a gravity drain.

It is a further object of this invention to provide a system in which the waste is drained from the tank under pressure thereby permitting the waste drainage passage to be dry during nonservicing periods.

It is another object of this invention to provide a pressurized drainage from a waste storage tank in a vacuum flush toilet system which eliminates leakage from the waste storage tank.

It is another object of this invention to provide such a drainage system which is easy to maintain and relatively economical to install.

SUMMARY OF THE INVENTION

In accordance with the above-stated objects, a drainage for a toilet waste holding tank is provided. Preferably, the toilet system includes a toilet bowl having a drain line coupled to the inlet of a waste storage tank. The waste storage tank generally is of the type having a vacuum line coupled thereto with a vacuum pump installed to create a partial vacuum within the waste holding tank to remove waste from the toilet bowl under the force of the vacuum. The drain system includes a drainage opening located in an upper portion of the waste holding tank above the level of waste within the tank. A drain line having a first and second end is coupled at its first end to the drainage opening and at its second end to the ground service panel of the aircraft. A directional flow control device selectively operable in two positions is installed in the vacuum line. A blower is installed in the vacuum line such that when the flow control device is in a first position the blower exhausts to the exterior of the airplane drawing air from within the waste holding tank and creating a partial vacuum in the tank to enable waste to be sucked from the toilet bowl to the waste holding tank. In a second position of the flow control device the blower draws air from outside the aircraft and directs the air into the interior of the waste holding tank, to pressurize the interior of the waste holding tank. The pressure within the tank forces the waste up through the drainage opening and out through the drain line to the service panel of the aircraft to empty the tank of waste. Preferably, the drain line is fitted with a second directional flow control device operable to direct the drain line into the upper portion of the tank when the aircraft is in flight to prevent siphoning of the waste from the tank through the drain line to the service panel.

In a preferred embodiment of the drainage system of the present invention an auxiliary pressurizing line is installed, adapted to be coupled to a compressed air source external to the aircraft for pressurizing the tank in case of failure of the blower.

BRIEF DESCRIPTION OF THE DRAWINGS

The drainage system of the present invention will be better understood by those of ordinary skill in the art and others upon reading the ensuing specification in conjunction with the attached drawings wherein.

DETAILED DESCRIPTION OF THE PREFERRED EMBODIMENT

Figure 1:
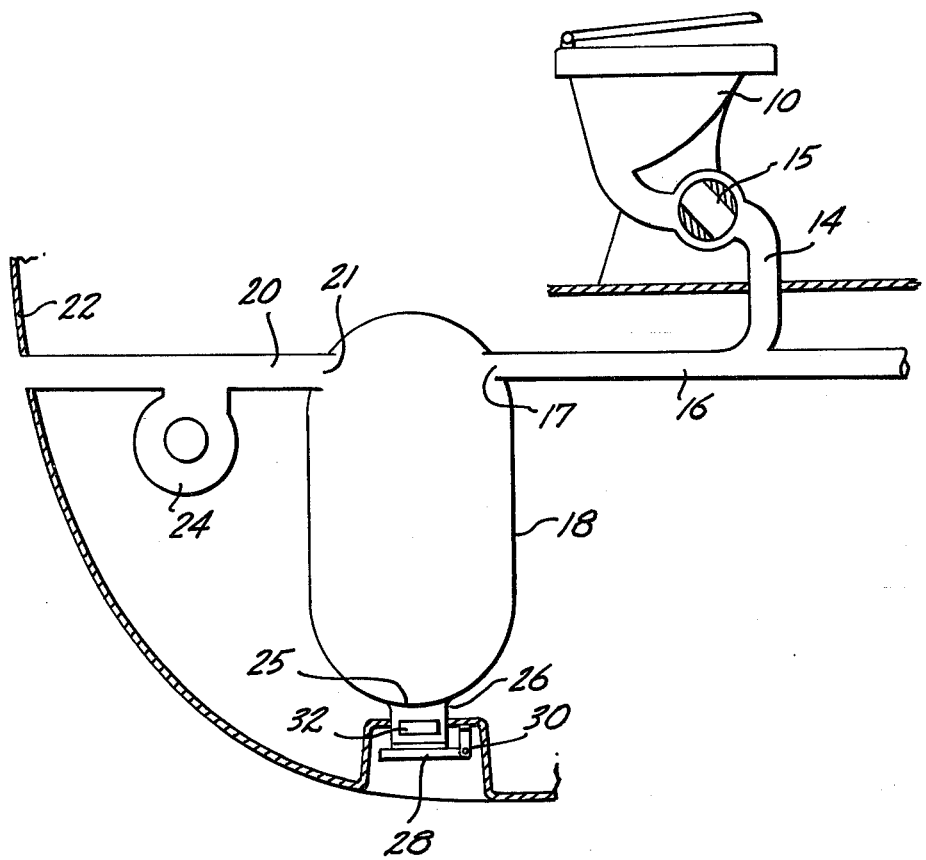
FIG. 1 is a diagram of a lavatory system for an aircraft of the type which flushes the bowl by a vacuum.

Referring now to FIG. 1, a conventional vacuum flush toilet system for use in a commercial aircraft is depicted. A toilet bowl 10 drains into a toilet drain 14. A flush valve 15 is installed in the toilet drain line to block passage of waste from the toilet bowl into the drain line when the valve is in a first position. The valve is movable to a second position to open the passage between the toilet bowl and the toilet drain 14. The toilet drain 14 is one of several in the aircraft which drain into a common waste drain line 16 which in turn leads to a waste storage tank 18 having a waste accepting port 17 formed in an upper portion thereof to which the common waste drain line 16 is coupled.

A vacuum exhaust line 20 is coupled at a first end to an exhaust opening 21 also located in the upper portion of the waste holding tank 18. The second end on the exhaust line 20 is coupled to an opening in skin 22 of the aircraft. A blower 24 is installed in the exhaust line 20 to remove air from the interior of the waste holding tank 18 and exhaust it to the air external to the aircraft to create a partial vacuum within the waste holding tank 18. In most systems the blower 24 is used only when the plane is flying below about 15,000 feet altitude or when the plane is on the ground. Above 15,000 feet the pressure differential between the interior of the aircraft and the external air pressure is sufficient to create a partial vacuum in the waste storage tank. When the toilet bowl is to be flushed the valve 15 in the toilet drain 14 is moved to a position opening the toilet drain and waste from the toilet bowl moves through the toilet drain and the common waste drain line 16 into the waste storage tank 18 to fill the partial vacuum within the waste drain tank 18, thereby flushing the toilet.

The waste storage tank 18 has a drain opening 25 formed in its lower portion along the lowermost portion of the tank wall. The waste storage tank drain opening 25 is coupled through a neckpiece 26 which passes through the skin 22 of the airplane to the ground service panel of the aircraft and is accessible to ground service crew. A drain cover 28 is installed over the mouth of the neckpiece 26 to seal the neck against the exit of waste from within the tank when the drain cover is in the closed position. The drain cover is pivotable about a pivot pin 30 to an open position in which the neck is open to the outer air and in conventional application is adapted to have a drainage hose (not shown) connected thereto leading to a tank truck which is used to haul waste away from the aircraft. A valve and/or an internal plug 32 (plug only shown) is sealingly mounted within the neckpiece 26 to prevent the passage of waste through the neckpiece so that the drain cover 28 can be opened without having waste material present immediately behind the drain cover to permit attachment of the hose. The internal plug 32 is adapted to be removed after the hose is connected to allow flow of waste from within the tank to the hose and truck.

In many of the aircraft flying today leakage was developed around the valve and/or internal plug 32 through deterioration of the seal of the plug causing a buildup of waste material directly behind the drain cover 28 such that when ground service personnel open the drain cover 28 to attach a hose thereto the waste material exits the neckpiece 26 and spills on the ground or on the ground service personnel causing unsanitary and unsightly conditions. Also, leakage tends to develop in the seal of the drain cover 28 so that during flight waste material leaks from within the tank 18 to the outer skin of the aircraft where it either falls to the earth as a liquid or becomes frozen due to the low temperatures encountered in flight and forms "blue ice" attached to the cover 28 in the vicinity of the ground service panel. Chunks of this "blue ice" periodically break off of the aircraft and fall to the ground with a potential of damage to persons and property below. Also, the chunks of "blue ice" tend to be drawn into the air intake of the jet engines causing potential hazards of engine malfunction and damage.

Figure 2:
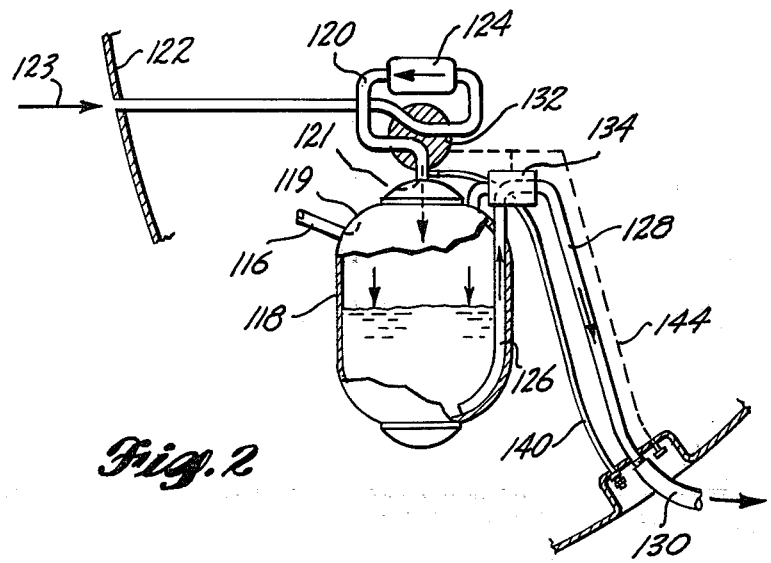
FIG. 2 is a somewhat schematic diagram of the drainage system of the present invention in the ground service mode.

FIG. 2 shows a waste storage tank 118 having the waste storage tank drainage system constructed in accordance with the principles of the present invention. The drainage system shown in FIG. 2 prevents leakage of waste material from within the tank 118 to the outer skin of the aircraft, thereby eliminating the formation of "blue ice" on the outer skin of the aircraft. The drain system shown in FIG. 2 also eliminates the possibility of waste building up in the drain line prior to opening of the drain line by service personnel, thereby minimizing the premature discharge of waste material during hook-up of the ground service connection to the waste removal truck.

A waste entry opening 119 is formed in the upper portion of the waste holding tank 118 much in the same manner as in the conventional system shown in FIG. 1 and a common waste drain line 116 is coupled to the several toilets of the aircraft and carries waste from the toilets to the waste entry opening of the waste storage tank. A pressurization line 120 is coupled at a first end to a pressurization opening 121 in the topmost portion of the tank 118. The second end of the pressurization opening is coupled to an opening in the outer skin 122 of the aircraft. A blower 124 is installed serially in the pressurization line 120 between the waste holding tank 118 and the outer skin of the aircraft. In the ground service mode shown in FIG. 2 the blower 124 draws air from outside the aircraft through the opening in the skin 122 (as indicated by the arrow 123) through the pressurization line 120 and forces the air into the waste storage tank 118 to pressurize the interior of the tank. A waste drain opening is formed in the upper portion of the tank 118 above the level of waste within the tank. An internal waste drain line 126 is mounted within the tank 118 with its first end located near the bottommost portion of the tank below the level of waste within the tank. A second end of the internal waste drain line 126 passes through the waste drain opening in the upper portion of the tank 118. Pressurization of the tank by means of blower 124 forces waste material through the internal drain line 126 and out of the tank through the waste drain opening. A first end of an external drain line 128 is coupled to the second end of the internal waste drain line 126. A second end of the external waste drain line 128 is connected through the ground service panel to the exterior of the aircraft. The ground service personnel can attach a hose 130 to the second end of the external waste drain pipe 128 to convey the waste from the tank 118 away from the aircraft and into a removal truck or some other storage facility on the ground to prepare the aircraft for further flights.

Figure 3:
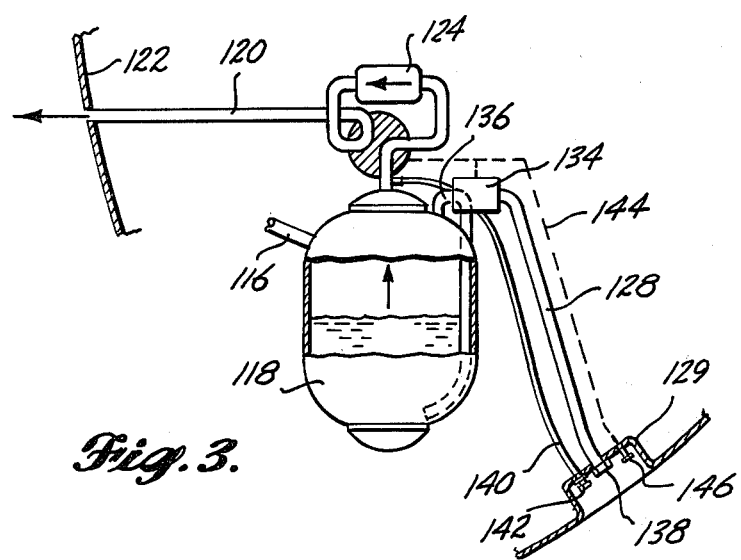
FIG. 3 is a somewhat schematic diagram of the drainage system of the present invention in the in-flight mode.

After the waste holding tank 118 has been drained of waste, blower 124 is shut off and pressurization of the tank ceases. A first directional flow control device 132 is installed in the pressurization line 120 between the blower 124 and the waste drain tank 118. The flow control 132 is selectively operable in two positions. The device is shown in its first position in FIG. 2 directing air from the blower 124 into the waste drain tank 118 to pressurize the tank interior. In FIG. 3 the flow control device 132 is shown in its second position in which it directs air from the tank to the blower 124 and from the blower through the pressurization line 120 and through the opening in the skin 122 to the open atmosphere. In the configuration of FIG. 3 the blower 124 acts to create a partial vacuum in the tank 118 to enable the vacuum flush system to operate, drawing waste from the various commodes through the line 116 into the tank 118. A second flow control device 134 is mounted between the internal and external waste drain lines and in a first position, as shown in FIG. 2, connects the internal waste drain line 126 with the external waste drain line 128. In the first position of the flow control device 134 waste flows from within the tank 118, through the waste drain lines and out through the service connection of the aircraft. In the second position of the flow control device 134, shown in FIG. 3, the device disconnects the internal waste drain line 126 from the external drain line 128 and couples the second end of the internal waste drain line 126 to a vent line 136 which leads back into the upper portion of the waste holding tank 118. Since the external waste drain line is disconnected completely from the tank there is no possibility of waste material spontaneously siphoning up the internal waste drain line 126 and leaking into the external drain line 128. Therefore, there can be no buildup of waste in the external waste drain line prior to connection by the ground service personnel, thereby eliminating any possibility of accidental spillage upon opening of a plug 138 which is normally present in the external drain line during in-flight condition. No waste can siphon into the internal waste drain line 126 since it is vented directly back into the waste holding tank 118 through the vent line 136.

At altitudes greater than 15,000 feet the pressure differential between the atmosphere external to the aircraft and the internal cabin pressure is such that the blower 124 is usually not needed to evacuate the waste holding tank since a partial vacuum is created by the pressure differentials. Therefore, the blower 124 in the flight mode is usually used for vacuum flushing only at altitudes below about 15,000 feet and on the ground.

Preferably, an auxiliary pressurization line 140 is connected at a first end to the ground service panel 129 and is fitted at its first end with a coupling 142 suitable for connection to a compressed air source on the ground service cart. The second end of the auxiliary pressurization line 140 is connected to the pressurization line 120 adjacent the connection of the pressurization line 120 to the tank 118. In case of failure of the blower 124 preventing pressurization of the tank 118 during waste removal servicing the auxiliary pressurization line 140 can be connected to a source of compressed air such as that found on conventional ground service carts and the compressed air can be used to pressurize tank 118 to permit draining of the tank. The flow control devices 132 and 134 are preferably connected to a control wire 144 which runs to the ground service panel 129 and which is operable by means of a handle 146 to simultaneously shift both flow control devices 132 and 134 simultaneously between their first and second positions to prepare the aircraft for either the flight mode or the ground service mode.

While the present invention has been described in conjunction with a vacuum flush toilet system, the pressurized waste holding tank emptying feature could be used with a conventional gravity flush toilet system as well. If a gravity flush toilet system were utilized the blower 124 would always be used for pressurization of the tank and would never be used to evacuate the tank. Therefore, only valve 134 would be necessary to open and close the waste drainage line between the ground service mode and the flight mode of the aircraft.

In summary therefore, a waste drainage system for emptying a waste holding tank in an aircraft toilet system includes a blower for drawing air from outside the aircraft and causing the air to flow into the waste holding tank to pressurize the tank. The pressurization of the tank forces waste within the tank upwardly through an internal drainage pipe having a first end below the level of waste in the tank and a second end coupled to a waste drain opening in the upper portion of the waste holding tank. A flow control device is included coupled to the second end of the internal waste drainage pipe and having two positions. In the first position the flow control device couples the internal drainage pipe to an external waste drainage pipe which leads to the ground service connection on the outer skin of the aircraft. In the second position the flow control device couples the internal waste drainage pipe to a waste vent pipe which leads back into the upper portion of the waste holding tank so that no waste can possibly siphon upwardly through the internal waste drainage pipe.

In the preferred embodiments an auxiliary pressurization line is provided, adapted to be coupled to an external source of compressed air for providing alternate pressurization of the tank. Also, the blower is connected to the waste holding tank through a flow control device which is operable in two positions. In the first position the flow control device couples the blower to the tank to force air into the tank for pressurization and in the second position the valve couples the blower to the exterior of the aircraft, drawing air from within the tank and exhausting it to the exterior of the aircraft to create a partial vacuum within the tank to facilitate the tank's use with a vacuum flush toilet system. While a preferred embodiment of the present invention has been described and illustrated herein, it will be apparent to those of ordinary skill in the art and others that changes can be made to the described embodiments while still remaining within the spirit and scope of the present invention. Therefore, the present invention is to be defined solely by reference to the claims which follow.

The embodiments of the invention in which an exclusive property or privilege is claimed are defined as follows.

1. In a vacuum flush toilet system, an apparatus for draining waste from the system, said apparatus comprising:
   a waste holding tank for receiving waste from the toilet, said tank having an upper portion and a lower portion and having a pressurization port and a waste drain opening formed in said upper portion;
   pressurization/vent means coupled to said pressurization port for pressurizing the interior of said tank in a first position of operation and to vent said tank in a selectively second position of operation; and
   an internal drain conduit having a first and second end, said first end being located adjacent the bottom of said waste holding tank below the normal level of waste within said tank and said second end coupled to said waste drain opening.

2. The waste drainage apparatus of claim 1 wherein said pressurization means includes:
   a pressurization conduit having first and second ends, said first end being coupled to said pressurization port, said second end opening to the ambient air; and
   a low pressure blower serially mounted in line with said pressurization conduit, said blower operable to draw ambient air through said pressurization line into the interior of said waste holding tank to pressurize said tank.

3. The waste drainage apparatus of claim 2 further including:
   first directional flow control means mounted serially in line with said pressurization conduit intermediate said blower and said pressurization port, said first directional flow control means being movable between a first and a second position, in said first position said directional flow control means directing the flow of air from said blower into said waste holding tank to pressurize the interior of said tank and in said second position said first directional flow control means directing the flow of air from said blower to said ambient air to create a partial vacuum within said waste holding tank.

4. The waste drainage apparatus of claim 3 further including:
an external waste drain conduit;
a vent conduit coupled to a first end thereof to said waste holding tank; and
second directional flow control means movable between a first and second position, in said first position said second directional flow control means coupling said second end of said internal drainage conduit to said external drainage conduit and in said second directional flow control means coupling said second end of said internal drainage conduit a second end of to said vent conduit.

5. The waste drainage apparatus of claim 4 further including:
auxiliary pressurization means coupled to said pressurization port of said holding tank.

6. The waste drainage apparatus of claim 5 wherein said auxiliary pressurization means includes a hose coupled to said pressurization portion at a first end and having a coupling affixed to its second end adapted for coupling to a compressed air source.

7. The waste drainage apparatus of claim 5 further including:
actuation means located remotely from said first and second directional flow control means and operable to simultaneously move said first and said second directional flow control means between their first and second positions.

8. In an aircraft lavatory system of the type providing a vacuum flushing capability wherein said vacuum for flushing said lavatory system is provided by a blower which vents air from a waste holding tank to the exterior of the aircraft, the improvement comprising:
directional flow control means coupled to said blower means and said waste holding tank and selectively operable to direct the flow of air from said blower into said tank in a first position of operation, thereby pressurizing said tank to aid in the removal of waste material from said waste holding tank and to direct air from the tank to the blower to the open atmosphere in a second position of operation.

9. The improvement of claim 8 further including:
a waste drainage port formed in an upper portion of said waste holding tank; and
a drainage conduit having a first and second end, said first end being located at the bottom of said waste holding tank below the normal level of waste within the tank, the second end being coupled to said waste drainage port.

* * * * *

UNITED STATES PATENT AND TRADEMARK OFFICE
CERTIFICATE OF CORRECTION

PATENT NO. : 4,332,041

DATED : June 1, 1982

INVENTOR(S) : Bjorn R. Kristoffersen

It is certified that error appears in the above-identified patent and that said Letters Patent are hereby corrected as shown below:

Column 3, line 22: Insert --the-- before "ground

Column 4, line 27: "bottomost" should be --bottommost--

Column 5, line 45: Delete "simultaneously"

Column 7, line 10: "to" (first occurrence) should be --at-- line 16: After "second" insert --position said second-- line 18: After "conduit" (first occurrence) insert --to-- line 18: Delete "to"

Signed and Sealed this

Twenty-fourth Day of August 1982

[SEAL]

Attest:

GERALD J. MOSSINGHOFF

Attesting Officer     Commissioner of Patents and Trademarks